United States Patent
Marchand et al.

(10) Patent No.: US 8,942,124 B2
(45) Date of Patent: *Jan. 27, 2015

(54) METHOD FOR OPTIMIZING THE TRIGGERING OF THE TRANSMISSION OF BUFFER STATUS REPORTING (BSR) INFORMATION

(75) Inventors: Pierre Marchand, Paris (FR); Christophe Rosik, Suresnes (FR)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,870

(22) Filed: Sep. 14, 2012

(65) Prior Publication Data
US 2013/0010738 A1      Jan. 10, 2013

Related U.S. Application Data

(63) Continuation of application No. 12/734,509, filed as application No. PCT/JP2008/073678 on Dec. 18, 2008.

(30) Foreign Application Priority Data

Jan. 8, 2008   (EP) .................................. 08100193

(51) Int. Cl.
*H04L 12/26* (2006.01)
*H04W 16/02* (2009.01)
(Continued)

(52) U.S. Cl.
CPC ...... *H04W 72/1284* (2013.01); *H04W 72/1242* (2013.01)
USPC ........... 370/252; 370/429; 370/431; 370/463; 370/464

(58) Field of Classification Search
CPC .................... H04W 28/0278; H04W 28/0257; H04W 28/0263; H04L 47/50; H04L 49/9026; H04L 2012/6464
USPC ................. 370/310, 328–329, 351, 389, 412, 370/428–429; 455/403, 422.1, 450, 452.2, 455/39, 500, 507, 509, 512
See application file for complete search history.

(56) References Cited

U.S. PATENT DOCUMENTS 8,059,597 B2 * 11/2011 Park et al. ..................... 370/329
2005/0030953 A1    2/2005 Vasudevan et al.
(Continued)

FOREIGN PATENT DOCUMENTS

EP            1 643 690 A1     4/2006

OTHER PUBLICATIONS

NTT DoCOMo and NEC, "Buffer Status Report and Scheduling Request triggers," Oct. 2, 2007, 3GPP TSG RAN WG2 Meeting #59bis R2-074173, pp. 1-4.*
(Continued)

*Primary Examiner* — Omar Ghowrwal
(74) *Attorney, Agent, or Firm* — McGinn IP Law Group, PLLC

(57) ABSTRACT

A method, performed by a user equipment (UE), for transmitting Buffer Status Reporting (BSR) information from the UE to a base station (BS) in a wireless telecommunication network, includes storing data to be transmitted, via a logical channel, in a transmission buffer, the logical channel being provided with a priority level and a specific Prioritized Bit Rate (PBR) parameter indicating a resource level to allocate to the UE for transmitting the stored data, wherein the BSR information represents an amount of data present in the transmission buffer of the UE, receiving new uplink data belonging to a logical channel for which no data already existed in the UE transmission buffer, and transmitting Buffer Status Reporting information upon receipt of the new uplink data.

18 Claims, 3 Drawing Sheets

(51) Int. Cl.
*H04B 7/26* (2006.01)
*H04W 72/12* (2009.01)

(56) References Cited

U.S. PATENT DOCUMENTS

2006/0246847 A1  11/2006  Kim et al.
2007/0177536 A1   8/2007  Brueck et al.
2009/0104916 A1*  4/2009  Rosa et al. .................... 455/453

OTHER PUBLICATIONS

NEC, "Triggers for Buffer Status Report," Jan. 7, 2007, 3GPP TSG RAN WG2 Meeting #60bis R2-080095, pp. 1-5.*

NTT DoCoMo and NEC, "Buffer Status Report and Scheduling Request triggers," Oct. 2, 2007, 3GPP TSG RAN WG2 Meeting #59bis R2-074173, pp. 1-4.
NEC, "Triggers for Buffer Status Report," Jan. 7, 2007, 3GPP TSG RAN WG2 Meeting #60bis R2-080095, pp. 1-5.
U.S. Office Action dated Apr. 18, 2013 in U.S. Appl. No. 12/734,509.
LTE MAC specification (36.321 v2.0.0 Dec. 2007), 3rd Generation partnership project; Technical Specification Group Radio Access network; Evolved Universal Terrestrial Radio Access (E-UTRA) Medium Access Control (MAC) protocol specification (Release 8).
NEC, "Triggers for Buffer Status Report," Jan. 8, 2008, 3GPP TSG RAN WG2 Meeting #60bis R2-080095, pp. 1-5.
European Search Report dated Jun. 13, 2008.
U.S. Office Action in U.S. Appl. No. 12/734,509 dated Jun. 22, 2012.

* cited by examiner

METHOD FOR OPTIMIZING THE TRIGGERING OF THE TRANSMISSION OF BUFFER STATUS REPORTING (BSR) INFORMATION

The present application is a Continuation Application of U.S. patent application Ser. No. 12/734,509, filed on May 6, 2010, which is based on and claims priority from International Patent Application No. PCT/JP2008/073678, filed on Dec. 18, 2008, which is based on and claims priority from EP 08100193.5, field on Jan. 8, 2008, the entire contents of which are incorporated herein by reference.

TECHNICAL FIELD

The present invention pertains to telecommunication fields and concerns a method for optimizing the estimation by a Base Station of the resource to allocate to a User Equipment for transmitting uplink data in a wireless telecommunication network.

More precisely, the invention concerns a method for optimizing the triggering of the transmission of Buffer Status Reporting (BSR) information from a User Equipment (UE) to a Base Station (BS) in a wireless telecommunication network, said UE comprising a transmission buffer for storing data to be transmitted via a plurality of logical channels, each logical channel being provided with a priority level and a specific Prioritized Bit Rate parameter indicating the minimum resource level to allocate to the UE for transmitting the stored data, said BSR information allowing said Base Station to schedule the amount of resource to allocate to the UE.

The invention concerns also a User Equipment (UE) comprising means for optimizing the triggering of the transmission of Buffer Status Reporting (BSR) information to a Base Station (BS) in a wireless telecommunication network.

BACKGROUND ART

In a mobile communication network such as UMTS, UE (User Equipment) is provided with a Limited amount of power for transmitting different class of logical traffic channels during an uplink communication. Each logical channel transporting different services and/or signalling data which necessitates specific rate and/or QoS (Quality of Service).

At each elementary transmission time interval (TTI), the UE selects a sub-rate for each channel by selecting a TFC (Transport Format Combination).

The selection of the TFC (Transport Format Combination) to be used in the uplink during each TTI is under the control of the MAC (Medium Access Control) layer of the UE which selects the TFC according not only to the data available to be sent and the priority of the flows to which the data belongs, but also to a maximum transport block size communicated by the Base Station, which depends on the conditions of the radio channel.

According to the current selection scheme, a User Equipment must report to the Base Station the reporting is properly defined both in terms of content and triggering.

Since the mobile may have several data flows running at the same time (i.e. several radio bearers) it is important that the content of the BSR takes into account the data queues associated to each bearers, but at the same time tries to reduce the amount of information sent to the network in order to reduce the signaling overhead. Hence there is a compromise between the level of detail contained in the BSR and the amount of resources needed to send this BSR.

Moreover, in order to reduce signaling overhead, it is felt sensible not to send the BSR at each transmitting occasion (each TTI). Instead, a number of triggers are defined in order to send the BSR when really needed.

It is to be noted that the current 3GPP standard specification requires that a BSR is triggered in the following conditions:

a—If the UE has no resource to transmit, and some data arrives in one of the queues, the BSR is triggered, b—If data with higher priority than the data already in the transmission buffer arrives, the BSR is triggered, d—A BSR is triggered when a serving cell change occurs, e—Periodic trigger of the BSR may also be configured by higher layers.

Moreover, in the current LTE MAC specification (36.321 v2.0.0 December 2007), a BSR shall be reported if uplink data arrive in the UE transmission buffer and the data belong to a logical channel, group with higher priority than those for which data already existed in the UE transmission buffer.

As it is, this condition does not take into account the PBR (Prioritized Bit Rate) concept introduced in LTE over HSUPA to avoid starvation of lower priority radio bearers.

Specifically, this PBR concept means that some part of the data possibly queued in a LCH (logical channel) of less priority (or in a LCH group of less priority) than another LCH (or LCH group) must actually be treated with a higher priority than the part of the data exceeding the PBR of higher priority LCH's (or LCH groups).

Consequently, there is no warranty that enough resource will be left by the Base Station to ensure the transmission of data queued in a LCH (logical channel) of less priority.

It is therefore desirable to add additional trigger(s) to take into account the PBR concept to avoid starvation of lower priority radio bearers problems.

Document US 2007/0177536 A1 discloses a method for scheduling uplink resource for uplink transmission in which a timing for collection of metrics regarding resource consumption is decoupled from a timing for generating scheduling grants to allow a scheduler to collect the received data information from a plurality of users that have sent E-DCH data within one transmission time interval (TTI) in order to get information of the sum of all users to make a correct decision.

Document EP 1 643 690 A1 discloses a method for scheduling in a mobile communication system a plurality of priority flows data transmitted by a plurality of mobile terminals via a plurality of dedicated uplink channels to a base station.

The method described in this document consists in providing the scheduling base station with QoS information of respective uplink priority flows.

DISCLOSURE OF INVENTION

The object of the invention is achieved by means of a method for optimizing the transmission of Buffer Status Reporting (BSR) information from a User Equipment {UE) to a Base Station (BS) in a wireless telecommunication network, said UE comprising a transmission buffers for storing data to be transmitted via a plurality of logical channels, each logical channel being provided with a priority level and a specific Prioritized Bit Rate parameter indicating the minimum resource level to allocate to the UE for transmitting the stored data, said BSR information allowing said Base Station to schedule the amount of resource to allocate to the UE.

According to the invention, the transmission of the BSR (Buffer Status Reporting) information is triggered if new uplink data arrive in the UE transmission buffer and said new uplink data belong to a logical channel for which a strictly positive PBR is defined and for which no data already existed in the UE transmission buffer.

In a second embodiment of the invention, the transmission of the BSR information is triggered if said new uplink data belong to a logical channel (respectively to a channel of a group of logical channels) having a non null PBR value and a priority level lower than that of a logical channel (respectively than that of a group of logical channels) for which the buffer already contains data to transmit, and for which sufficient resources have already been allocated by the Base Station to the UE.

In a third embodiment of the invention, the transmission of Buffer Status Reporting information is triggered if new uplink data arrive in the UE transmission buffer and the data belongs to a logical channel for which difference between the PBR token bucket status and the data that already existed in the UE transmission buffer of the same logical channel was strictly positive.

In a fourth embodiment of the invention the transmission of Buffer Status Reporting information is triggered if new uplink data arrive in the UE transmission buffer and said new uplink data belong to a logical channel for which the PBR would not be satisfied even by sending the data already existing in the UE transmission buffer of the same logical channel.

In a fifth embodiment of the invention the transmission of Buffer Status Reporting information is triggered if on one hand new uplink data arrive in the UE transmission buffer and the data belongs to a logical channel for which the PBR would not be satisfied even by sending the data already existing in the UE transmission buffer of the same logical channel, and on the other hand any other logical channel having a higher priority than the said logical channel satisfies its PBR criteria.

The method according to the invention is implemented by means of a User Equipment configured for systematically transmitting Buffer Status Reporting information to the Base Station if new uplink data arrive in the UE transmission buffer and if said new uplink data belong to a logical channel for which a positive PBR is defined, and for which no data already existed in the UE transmission buffer.

In a second embodiment of the invention, said User Equipment is configured for systematically transmitting the BSR information to said Base Station if new uplink data arrive in the UE transmission buffer and said new uplink data belong to a logical channel having a non null PBR value and a priority level lower than that of a logical channel for which the buffer already contains data to transmit, and for which sufficient resources have already been allocated by the Base Station to the UE.

In a third embodiment of the invention, said User Equipment is configured for systematically transmitting the BSR information to said Base Station if new uplink data arrive in the UE transmission buffer and the data belongs to a logical channel for which difference between the PBR token bucket status and the data that already existed in the UE transmission buffer of the same logical channel was strictly positive.

In a fourth embodiment of the invention, said User Equipment is configured for systematically transmitting BSR information to said Base Station if new uplink data arrive in the UE transmission buffer and the data belongs to a logical channel for which the PBR would not be satisfied even by sending the data which the PBR would not be satisfied even by sending the data already existing in the UE transmission buffer of the same logical channel.

In a fifth embodiment of the invention, said User Equipment is configured for systematically transmitting BSR information to said Base Station if on one hand new uplink data arrive in the UE transmission buffer and the data belongs to a logical channel for which the PBR would not be satisfied even by sending the data already existing in the UE transmission buffer of the same logical channel, and on the other hand any other logical channel having a higher priority than the said logical channel satisfies its PBR criteria.

BRIEF DESCRIPTION OF DRAWINGS

Other features and advantages of the invention will appear from the following description taken as a non limiting example with reference to the following drawings in which.

EXPLANATION OF REFERENCE

2, 4, 6, 8, 10, 12 Data

BEST MODE FOR CARRYING OUT THE INVENTION

Figure 1:
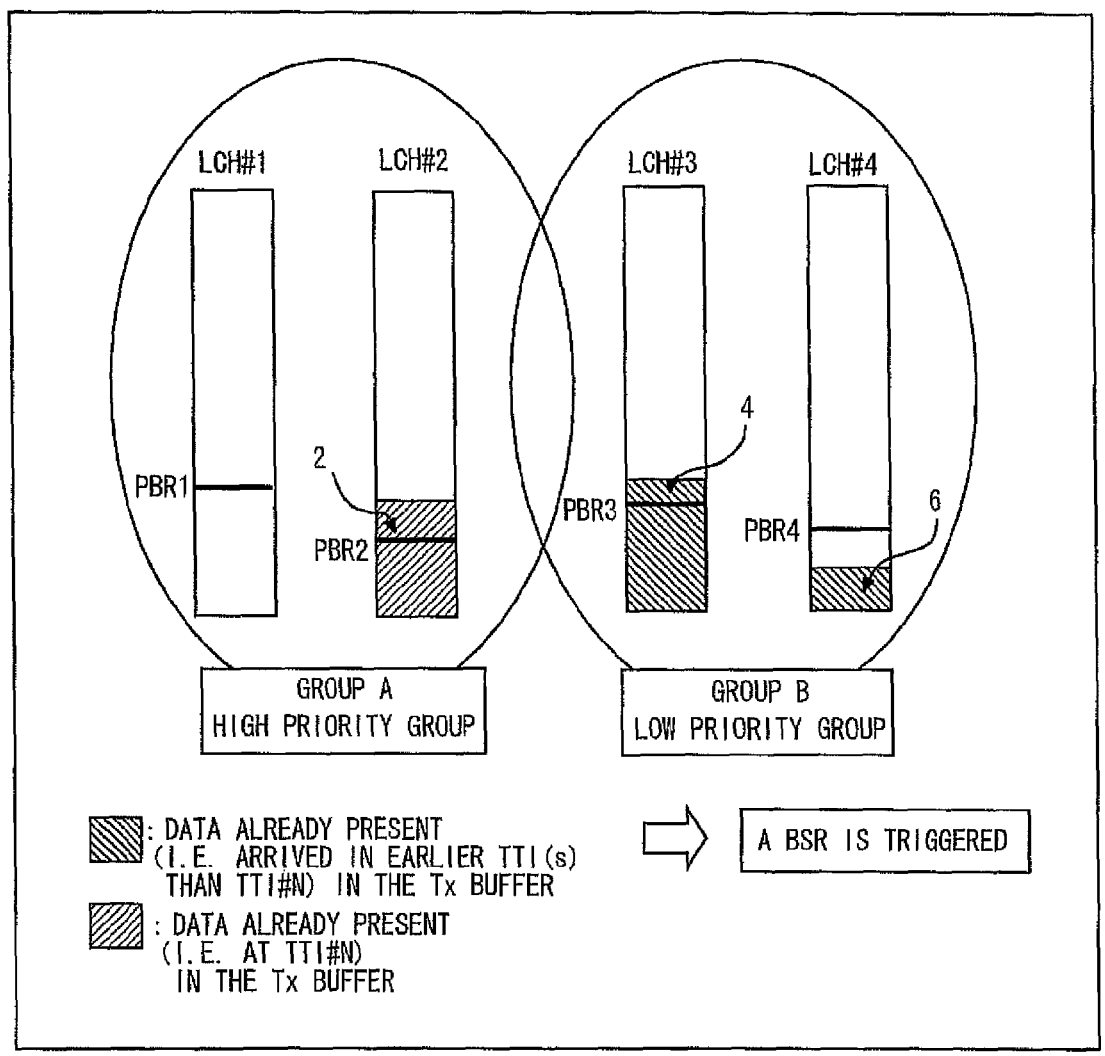
FIGS. 1 and 2 illustrate schematically the BSR triggering mechanism as currently specified in the MAC specification, in two different situations.

In the example of FIG. 1, four radio bearers, or logical channels are grouped into 2 groups of 2 Radio Bearers (RB). Each group contains radio bearers assumed to have the same priority class, i.e. similar QoS requirements. Group A contains the RB's of highest priority, and Group B contains the RB's of lower priority.

Each logical channel is provided with a PBR#x horizontal line representing the amount of data that should be sent at a TTI#N in order for the PBR to be satisfied in average for this Radio Bearer. For example, if a token/bucket mechanism is implemented to average the PBR, the line corresponds to the amount of tokens present in the bucket at TTI#N for this Radio Bearer.

It is to be noted that instead of reporting the Buffer Occupancy (B.O.) for each of the RB's separately, the specification allows that the UE reports only 2 values, Report A and Report B, consisting of the sum of all the data queued in the RB's of groups A and B, respectively.

The specification also allows that the UE reports the buffer status of one group only (short report) or of all the groups together {long report). Hence, in the case illustrated by FIG. 1, a short report would consist of either Report A or Report B, and a long report would consist of Report A and Report B together. However, the specification still does not clearly states what are the conditions to decide whether a long or a short report should be made.

In the situation of FIG. 1, according to trigger as defined in the current 3GPP standard specification, a BSR will be triggered because data 2 arrive in LCH#2 which belongs to Group A, which is the high priority group compared to Group B, and the data (4,6) existing before the current TTI was in Group B.

Figure 2:
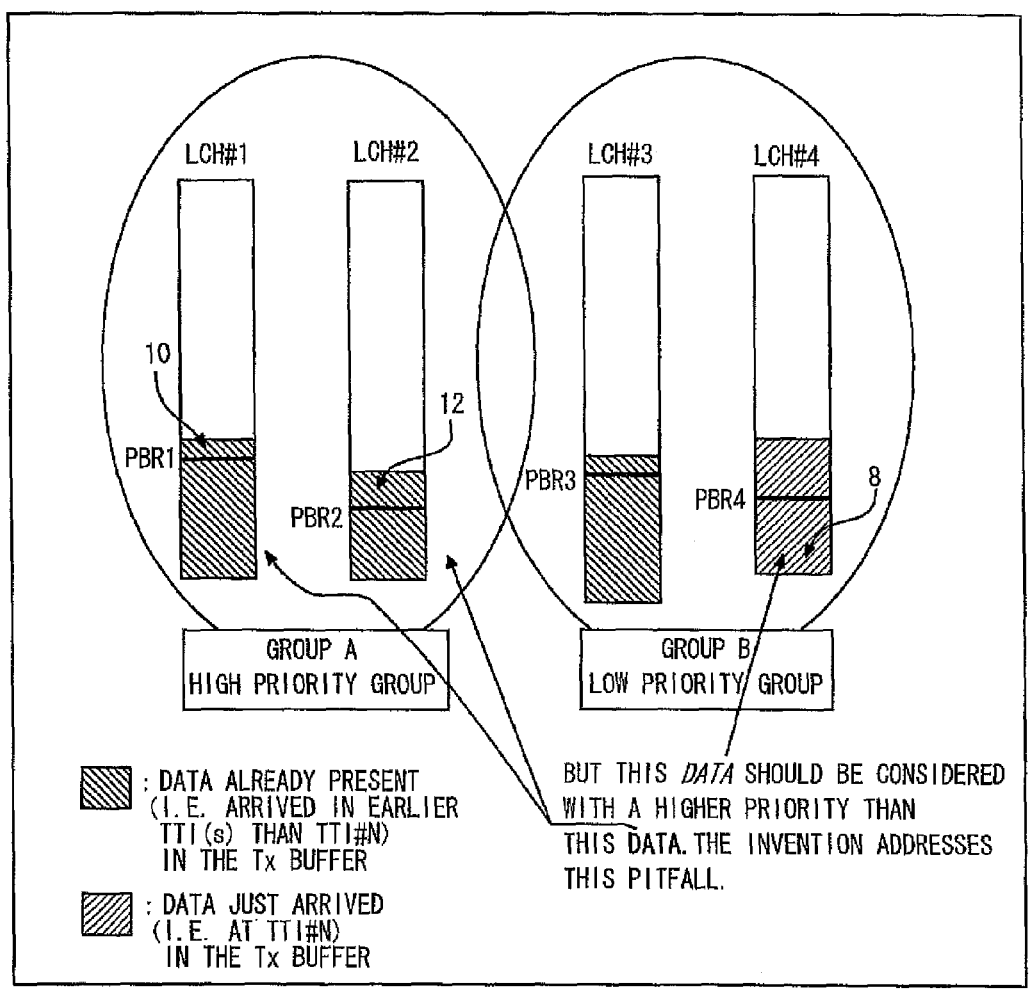

In the situation of FIG. 2, no BSR is triggered, because the arriving data 8 is in Group B, and it is considered that the data (10,12) in Group A is of higher priority. Since the data (10,12) in Group A arrived in previous TTI(s), it has been notified to the network by previous BSR(s) and since the network has already been made aware of this status, it is assumed that the current allocated resource is enough to accommodate with the data present in Group A and not transmitted yet.

However, according to the invention, in order to avoid starvation of LCH#4, a BSR is notified to the network because the data 8 that just arrived in Group B is objectively regarded as having a higher priority than the data (10,12) present in Group A.

Figure 3:
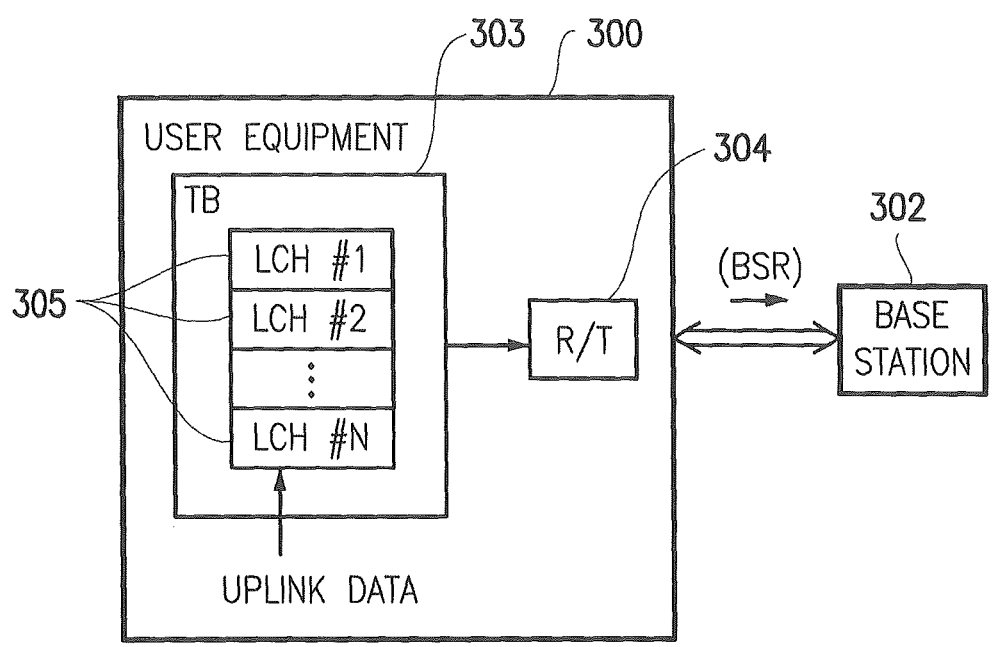
FIG. 3 illustrates transmission of BSR information from a User Equipment to a Base Station.

FIG. 3 illustrates UE 300 for transmitting BSR information from the UE to a base station in a wireless telecommunication network, in which UE 300 includes a Transmission Buffer (TB) for storing data to be transmitted via a logical channel 305, and a transmitter (R/T) 304 for transmitting of the BSR information upon receipt of the new uplink data.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from European patent application No. 08100193.5, filed on Jan. 8, 2008, the disclosure of which is incorporated herein in its entirety by reference.

INDUSTRIAL APPLICABILITY

The present invention provides a method for optimizing the estimation by a Base Station of the resource to allocate to a User Equipment for transmitting uplink data in a wireless telecommunication network.

The invention claimed is:

1. A method, performed by a user equipment (TYE), for transmitting Buffer Status Reporting (BSR) information from the UE to a base station (BS) in a wireless telecommunication network, said method comprising:
   storing data to be transmitted, via a logical channel, in a transmission buffer, the logical channel being provided with a priority level and a specific Prioritized Bit Rate (PBR) parameter indicating a resource level to allocate to the UE for transmitting the stored data, wherein said BSR information represents an amount of data present in the transmission buffer of the UE;
   receiving new uplink data;
   determining whether said new uplink data belongs to a logical channel for which no data already existed in the UE transmission buffer and for which a non null PBR is defined; and
   the transmitting of the BSR information upon receipt of said new uplink data in dependence on said determination,
   wherein the transmission of the BSR information is triggered when said new uplink data belongs to a logical channel, respectively to a channel of a group of logical channels, having a non null PBR value and a priority level lower than that of a logical channel, respectively than that of a group of logical channels, for which the buffer already contains data to transmit, and for which sufficient resources have already been allocated by the base station to the UE.

2. A method, performed by a user equipment (UE), for transmitting Buffer Status Reporting (BSR) information from the UE to a base station (BS) in a wireless telecommunication network, said method comprising:
   storing data to be transmitted, via a logical channel, in a transmission buffer, the logical channel being provided with a priority level and a specific Prioritized Bit Rate (PBR) parameter indicating a resource level to allocate to the UE for transmitting the stored data, wherein said BSR information represents an amount of data present in the transmission buffer of the UE;
   receiving new uplink data belonging to a logical channel for which no data already existed in the transmission buffer of the UE; and
   the transmitting of the BSR information upon receipt of said new uplink data,
   wherein the transmission of the BSR information is triggered when said new uplink data belongs to a logical channel, respectively to a channel of a group of logical channels, having a non null PBR value and a priority level lower than that of a logical channel, respectively than that of a group of logical channels, for which the buffer already contains data to transmit, and for which sufficient resources have already been allocated by the base station to the UE.

3. The method according to claim 1, wherein the transmission of the BSR information is triggered when said new uplink data arrives in the UE transmission buffer and the data belongs to a logical channel for which a difference between a PBR token bucket status and data that already existed in the UE transmission buffer of a same logical channel was strictly positive.

4. The method according to claim 1, wherein the transmission of the BSR information is triggered when said new uplink data arrives in the UE transmission buffer and said new uplink data belong to a logical channel for which the PBR would not be satisfied by sending data already existing in the UE transmission buffer of a same logical channel.

5. The method according to claim 4, wherein the transmission of the BSR information is triggered when any other logical channel having a higher priority than said logical channel satisfies its PBR criteria.

6. A User Equipment (UE) for transmitting Buffer Status Reporting (BSR) information from the UE to a base station (BS) in a wireless telecommunication network, said UE comprising:
   a transmission buffer for storing data to be transmitted via a logical channel, the logical channel being provided with a priority level and a specific Prioritized Bit Rate (PBR) parameter indicating a resource level to allocate to the UE for transmitting the stored data, wherein said BSR information represents an amount of data present in the transmission buffer of the UE,
      wherein said transmission buffer is configured to receive new uplink data, and
      wherein said UE is configured to determine whether said new uplink data belongs to a logical channel for which no data already existed in the UE transmission buffer and for which a non null PBR is defined; and
   a transmitter for said transmitting of the BSR information upon receipt of said new uplink data in dependence on said determination,
   wherein the UE is configured for systematically transmitting the BSR information to said base station when said new uplink data arrives in the UE transmission buffer and said new uplink data belongs to a logical channel having a non null PBR value and a priority level lower than that of a logical channel for which the buffer already contains data to transmit, and for which sufficient resources have already been allocated by the base station to the UE.

7. A User Equipment (UE) for transmitting Buffer Status Reporting (BSR) information from the UE to a base station (BS) in a wireless telecommunication network, said UE comprising:
   a transmission buffer for storing data to be transmitted via a logical channel, the logical channel being provided with a priority level and a specific Prioritized Bit Rate (PBR) parameter indicating a resource level to allocate to the UE for transmitting the stored data, wherein said BSR information represents an amount of data present in the transmission buffer of the UE, wherein said transmission buffer is configured to receive new uplink data belonging to a logical channel for which no data already existed in the transmission buffer of the UE; and a transmitter for said transmitting of the BSR information upon receipt of said new uplink data, wherein the UE is configured for systematically transmitting the BSR information to said base station when new uplink data arrives in the UE transmission buffer and said new uplink data belongs to a logical channel having a non null PBR value and a priority level lower than that of a logical channel for which the buffer already contains data to transmit, and for which sufficient resources have already been allocated by the base station to the UE.

8. The User Equipment according to claim 6, wherein the UE is configured for systematically transmitting of the BSR information to said base station when said new uplink data arrives in the UE transmission buffer and the data belongs to a logical channel for which a difference between a PBR token bucket status and data that already existed in the UE transmission buffer of a same logical channel was strictly positive.

9. The User Equipment according to claim 6, wherein the UE is configured for systematically transmitting the BSR information to said base station when said new uplink data arrives in the UE transmission buffer and the data belongs to a logical channel for which the PBR would not be satisfied by sending data already existing in the UE transmission buffer of a same logical channel.

10. The User Equipment according to claim 9, wherein the UE is configured for systematically transmitting the BSR information to said base station when any other logical channel having a higher priority than said logical channel satisfies its PBR criteria.

11. The method according to claim 1, wherein said BSR information allows said base station to schedule an amount of resource to allocate to the UE.

12. The method according to claim 1, wherein the transmission of the BSR information is triggered when said new uplink data belongs to a logical channel that includes a non null PBR value and a priority level.

13. The method according to claim 1, wherein the transmission of the BSR information is triggered when said new uplink data belongs to a logical channel that includes a non null PBR value and a priority level lower than that of a logical channel, respectively than that of a logical channel for which the buffer already contains data to transmit, and for which sufficient resources have already been allocated by the base station to the UE.

14. The method according to claim 2, wherein said new uplink data belongs to a logical channel for which a PBR is defined.

15. The User Equipment according to claim 6, wherein said BSR information allows said base station to schedule an amount of resource to allocate to the UE.

16. The User Equipment according to claim 6, wherein the transmission of the BSR information is triggered when said new uplink data belongs to a logical channel that includes a non null PBR value and a priority level.

17. The User Equipment according to claim 6, wherein the transmission of the BSR information is triggered when said new uplink data belongs to a logical channel that includes a non null PBR value and a priority level lower than that of a logical channel, respectively than that of a logical channel for which the buffer already contains data to transmit, and for which sufficient resources have already been allocated by the base station to the UE.

18. The User Equipment according to claim 7, wherein said new uplink data belongs to a logical channel for which a PBR is defined.

* * * * *